United States Patent [19]

Semin et al.

[11] 4,235,626
[45] Nov. 25, 1980

[54] METHOD AND APPARATUS FOR STIRRING MOLTEN METAL

[76] Inventors: Sergei S. Semin, ulitsa Svobody, 184, kv. 63; Viktor I. Plokhov, ulitsa Stroitelei, 20, kv. 75; Igor A. Partin, ulitsa Svobody, 230, kv. 164; Boris S. Dolzhenkov, ulitsa Aerodromnaya, 87, kv. 2; Jury N. Lanin, ulitsa Fizkulturnaya, 13, kv. 66, all of Kuibyshev, U.S.S.R.

[21] Appl. No.: 971,902

[22] Filed: Dec. 19, 1978

[51] Int. Cl.³ ............................ C22B 9/00; C21C 7/00
[52] U.S. Cl. ...................................... 75/93 R; 75/61; 266/233
[58] Field of Search ........................ 266/233; 75/93, 61

[56] References Cited

U.S. PATENT DOCUMENTS

| | | | |
|---|---|---|---|
| 3,278,295 | 10/1966 | Ostberg | 75/61 |
| 3,802,872 | 4/1974 | Ostberg | 75/61 |
| 3,972,709 | 8/1976 | Chia | 75/93 R |
| 4,046,559 | 9/1977 | Crimes | 75/93 R |

*Primary Examiner*—P. D. Rosenberg
*Attorney, Agent, or Firm*—Haseltine, Lake & Waters

[57] ABSTRACT

In the process of melting metal, a portion of molten metal is alternately withdrawn from beneath the surface of the body of molten metal and is expelled into the lower part of a metal holding means through a pipe of a gas-dynamic pump, which pipe, fitted in a cover of the metal holding means, is mounted for axial reciprocation and angular swinging in a ball-and-socket joint to thereby enable fan-like projection of a submerged metal jet within the limits of an angle corresponding to the dimensions of the metal holding means, thus providing for effective stirring of the melt body throughout the bottom area; stepwise reciprocation of the pump pipe is effected by means of a pneumatic positioning device, and the frequency of the metal-withdrawing and metal-expelling cycles is alternated during operating process with the aid of a preset time relay.

7 Claims, 4 Drawing Figures

METHOD AND APPARATUS FOR STIRRING MOLTEN METAL

BACKGROUND OF THE INVENTION

The present invention relates to metallurgy, and more particularly to a method and apparatus for stirring molten metal directly in a furnace where the metal is melted, such stirring being advantageously effected to enhance the rate of melting or to maintain uniformity of composition or temperature in a standing body of molten metal.

A variety of methods have been used for stirring molten metal directly in the bath of a melting furnace, including mechanical, electromagnetic, gas dynamical and others. This invention proposes a method for stirring molten metals, such as aluminum and similar alloys, which is both effective and simple to carry out.

U.S. Pat. No. 4,008,884 discloses a method and apparatus for stirring molten metal. The apparatus described in this patent comprises a means for stirring a body of molten metal, including a tubular conduit structure arranged to project downwardly into the molten metal, and cooperating means (ejector) for effecting the withdrawal and delivery of metal through a nozzle at the lower end of the tubular structure. The procedure of stirring a body of molten metal comprises the steps of alternately withdrawing molten metal upwardly from the body in a confined space to a level above the body and expelling the withdrawn molten metal into the body as a submerged high velocity jet. The alternate metal-withdrawing and metal-expelling steps are effected by alternately applying suction and gaseous fluid (air) under pressure in the confined space above the molten metal body. The gaseous fluid (air) is supplied from a suitable source through solenoid inlet and outlet valves to the ejector.

The sequence of the metal-withdrawing and metal-expelling steps is controlled by means of a vacuum relay and by a time delay relay. To control a permissible level of the body of molten metal, an electrically conductive probe is introduced inside the stirrer pipe to signal and trigger a shutdown operation should metal rise into contact with the probe.

The method and apparatus of the patent referred to above have a number of disadvantages which, to a certain degree, limit the sphere of their application.

Immobile position of the stirrer pipe in the body of molten metal enables effective stirring of molten metal to be carried out in a rather limited area, which demands the installation of a great number of similar pumps, especially on large-capacity melting furnaces. In carrying out the melting of metal in a cylinder, - or square-shaped furnaces, even of relatively small capacity, the installation of at least two pumps will be required to ensure a rapid rate of melting or dissolving alloying additions. However, it is not always possible to mount a substantial plurality of pumps on a melting furnace, which in addition, requires an appreciable consumption of compressed gas. Furthermore, the withdrawal and expulsion of metal carried out at a definite constant level above the body of molten metal limits the sphere of application of the method and apparatus in question, which could have been rather promising from the point of view of creating optimum conditions for heat-and-mass exchange. This disadvantage is especially manifested in the course of melting solid charge, when the temperature of melt is still relatively low, and the washing of solid lumps of charge with a jet of molten metal having such low temperature is obviously insufficient to provide the best results insofar as the rate of melting and the use of the furnace heat are concerned. Furthermore, the use of the ejector for building up vacuum, which ejector is mounted on the pump and energized on completing the supply of compressed gas through a respective solenoid, drastically increases the time required for the metal-withdrawing operation. There seems to be hardly any apparent way to step up the rate of metal-withdrawing operation in this case also.

Under these circumstances, the operating efficiency of the pump is impaired, especially at the stage of melting solid charge, requiring a higher rate of the metal-withdrawing and metal-expelling operations.

SUMMARY OF THE INVENTION

It is therefore the principal object of the invention to provide such a method and apparatus for stirring molten metal that will make it possible to substantially enhance the efficiency of stirring the entire body of molten metal and to reduce the duration of melting operation.

Another object of the invention is to provide a method for stirring molten metal, which will permit production potentialties to be expanded in the event of melting and the stirring operation to be rendered more effective.

Still another object of the invention is to provide a method for stirring molten metal, permitting the quality of metal to be improved due to the removal of oxide impurities and other slag inclusions from the melt.

It is also an object of this invention to provide a method for stirring molten metal, which permits the consumption of compressed gas to be reduced without impairing the efficiency of stirring. Another object of the invention is to provide a method for stirring molten metal, which makes it possible to prevent the freezing of metal in pipes of gas-dynamic pumps, as well as the failure of the latter.

It is also an object of the invention to provide an apparatus for carrying into effect the method according to the invention for stirring molten metal without resorting to any substantial reconstruction of a melting furnace, enabling effective stirring of the entire body of molten metal.

Yet another object of the invention is to provide an apparatus for stirring molten metal, which will have longer service life due to the possibility of projecting the pump pipe beyond the melt bath. Still another object of the invention is provide an apparatus for stirring molten metal, which will exhibit uninterrupted effective operation regardless of the level of melt in a bath.

These and other objects and features of the invention are accomplished by the provison of a method for stirring a body of molten metal in a metal melting operation, comprising alternately withdrawing a portion of molten metal upwardly from the body in a confined space to a level above the body and expelling the withdrawn portion of molten metal into the body under the action of compressed gas, wherein, according to the invention, the said portion of metal is withdrawn directly from beneath the surface of molten metal and is expelled into a lower region of the body, adjacent to the bottom part of a metal holding means, the said alternate metal-withdrawing and metal-expelling steps being effected so that regardless of an increase in the level of the body of molten metal the portions thereof are always withdrawn from beneath the surface of molten metal and are expelled into a lower region of the body.

Such procedure permits enhanced stirring to be effected throughout the body of molten metal and the duration of melting process to be reduced owing to favourable conditions enabling intensive heat-and-mass exchange which occurs in the body of molten metal due to the fact that molten metal a withdrawn directly from beneath the melt surface, having a substantially higher temperature, and is then discharged into a lower region of the body of molten metal, having a lower temperature. Such metal-withdrawing and metal-expelling procedure is especially effective at the initial stage of the melting process when a jet of overheated metal is poured over the lumps of solid charge in a furnace to thereby enable their rapid melting.

It is advantageous that each portion of molten metal is discharged into the body of molten metal in a fan-like fashion as a jet of metal projected within the limits of an angle exceeding the angle of a free flow of the submerged metal jet and corresponding to the dimensions of a metal holding means, thereby enabling effective stirring of the entire melt body.

Such operation permits enhanced stirring of the entire body of molten metal, which is due to good stirring effect produced by the discharged jet of metal during each metal-expelling cycle on a substantially larger area of the melt bath. In addition, the jet of metal discharged in a fan-like fashion may be accompanied by turbulence created in this large area of the metal bath, which may be large enough to embrace the entire area of the metal bath bottom.

The jet of expelled metal is preferably projected in a fan-like fashion at a progressively increasing, in the process of melting, angle being one to twelve times the angle of free flow of metal jet per single pulse.

Such operating procedure makes it possible to expand production potentialities of the melting process, as well as to enhance the effect of stirring operation, owing to the fact that at the initial stage of melting solid charge, the jet of expelled metal is caused to follow a semicircular path within an angle embracing this lump of solid charge, i.e. within a confined zone. After the charge has been melted down, with the melt temperature to be stabilized, the zone within which the metal jet is discharged should preferably be extended to cover the entire bottom area of the melt bath. This permits of gaining substantial reduction in energy losses, since due to the control of the stirring operation, effected by means of projecting the jet of expelled metal in a fan-like fashion at a variable angle in the body of molten metal, favourable conditions are created to enable enhanced heat-and-mass exchange in the body of molten metal.

The frequency of the metal-withdrawing and metal-expelling cycles is preferably decreased in a stepwise manner to be from 30 to 2 cycles per minute. As a result, the quality of metal is improved by preventing the contamination of metal with oxide and slag inclusions during incorporation of alloying components, and by maintaining uniform temperature throughout the melt bath. When there is still a small amount of liquid metal in a melting chamber and its temperature is very low, the frequency of the metal-withdrawing and metal-expelling cycles should be at its maximum in order to prevent the freezing of metal in the pipe cavity. A maximum frequency of the above-mentioned operating cycles, about 30 cycles per minute, is also necessitated by the fact that the travelling path covered by liquid metal is rather short, being, in addition, hindered by the lumps of solid charge. When, however, the melt bath is to be maintained at a prescribed temperature prior to and in the process of discharging the metal from a melting furnace into a holding furnace or into any other vessel, the frequency of such operating cycles should be at minimum in order to prevent turbulence and undesirably high slagging of metal. The consumption of compressed gas required for the stirring operation is also reduced in this case.

The method according to the invention for stirring molten metal is carried into effect by means of an apparatus which preferably comprises a gas pump with a pipe having its lower end submerged in the body of molten metal, the other end thereof being fitted with a nozzle brought in communication through a compressed gas supply means with a compressed gas holding means, and a vacuum system connected to said upper end of the pipe, wherein, according to the invention, the said pipe is fitted in a refractory-lined cover above the metal holding means and mounted in guides for reciprocation along the axis thereof and connected with an actuator enabling stepwise reciprocation of the pipe in the metal body at a regulable speed and length of travel, as well as with an actuator intended for initial positioning of the pipe within, and its removal from, the melt body.

Such apparatus construction permits effective stirring of the entire body of molten metal, avoiding the need of any substantial reconstruction of a melting furnace, owing to the fact that the stirrer pipe is mounted for reciprocation in the refractory-lined cover above the metal bath in the guides. The actuator enabling stepwise reciproation of the pipe is provided to ensure optimum operating conditions for the molten metal to be withdrawn directly from beneath the melt surface and to be expelled into a lower region of the melt body. By regulating the speed of the pipe travel in the melt, it becomes possible to coordinate the stirring operation with the frequency of the metal-withdrawing and metal-expelling cycles. The provision of the actuator, intended for the pipe initial positioning in and its removal from the melt, permits of prolonging service life of the pipe by virtue of sharply decreasing the pipe residence time in an aggressive medium.

Although a variety of different embodiments may be utilized as the actuators enabling stepwise reciprocation of the pipe, a very effective instrumentality embraces a pneumatic positioner provided with discharge outlets and with regulable throttle valves adapted to communicate the discharge outlets with the atmosphere.

The preference of the positioning device of the type described above ensures effective operation of the pump regardless of the level of melt in the bath, since, as the level of the melt bath alternates, it becomes possible to change positions by communicating one of the discharge outlets with the atmosphere. A desired rapid operating rate is likewise ensured by appropriately adjusting a respective throttle valve in the discharge line.

It is advantageous that a ball-and-socket joint be positioned at the section of the pump pipe, extending beyond the refractory-lined cover of the metal holding means, as well as an actuator intended to enable angular displacement of the pump pipe about the said joint.

As a result, it becomes possible to project the jet of expelled metal in a fan-like fashion in the body of molten metal and to thereby achieve effective stirring of the latter throughout substantial area thereof due to the fact that the pump pipe is enable by means of the actuator for angular displacement, to perform turning motion during each metal-withdrawing and metal-expelling cycle.

From the above it follows that the invention is efficient enough to yield good results and superior advantages in metal-melting practice, permitting effective stirring of metal in a melting furnace with a minimum number of means and devices.

BRIEF DESCRIPTION OF THE DRAWINGS

The invention will be further described, by way of example only, with reference to the accompanying drawings, in which:

In FIG. 1, showing the withdrawal of molten metal from beneath the melt surface, $h_1$ is the height at which molten metal covers the truncation of the pump nozzle at the moment of the metal-withdrawing action;

In FIG. 2, showing the delivery of molten metal from the pipe to the body of molten metal under the action of compressed gas, $h_2$ is the height at which the truncation of the pump nozzle is covered with molten metal at the moment of its delivery;

Figure 3:
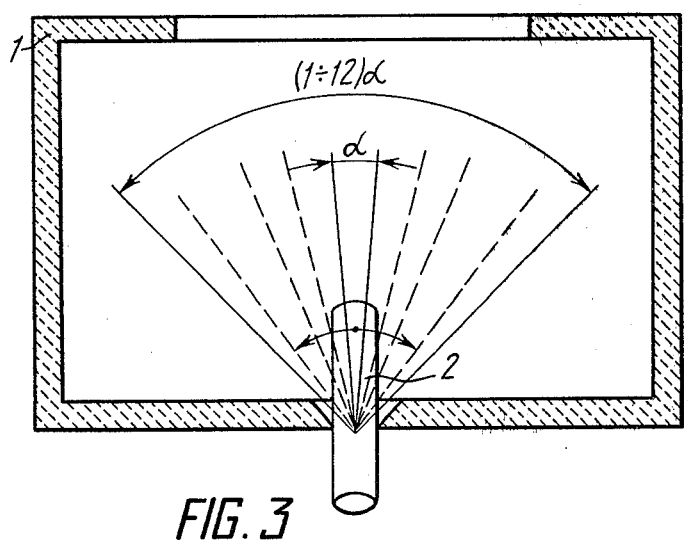
FIG. 3 is a schematic view showing the fan-like projection of the metal jet discharged into the body of molten bath.

P is the pressure of compressed gas;

Shown in FIG. 3 is the fan-like projection of the expelled jet of metal, effected by means of turning movement of the pump pipe, where $\alpha$ is the angle of free flow of the submerged jet of metal (for aluminum alloys this angle is about 15 deg.)

Figures 1, 2:
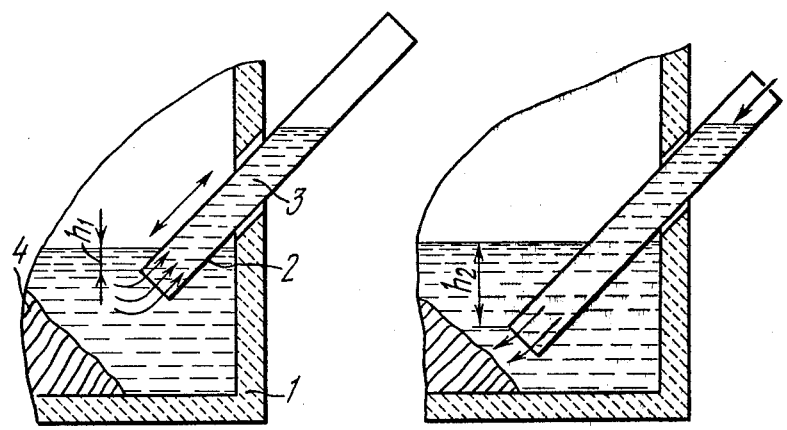
FIG. 1 is a schematic view showing the metal-withdrawing stage of the stirring procedure according to the invention.
FIG. 2 shows a phase of the metal-expelling stage of the stirring procedure according to the invention.

By way of example, FIGS. 1 to 3 are simplified views showing the basic structure of one form of melting furnace I to hold a body of molten metal, from which a metal portion 3 is delivered under suction from upper overheated layers of the body to the interior of a stirrer pipe 2 of a gas pump. Then, pulse P of compressed gas is applied to the withdrawn metal in the pipe, which is forcefully expelled therefrom to come in contact with a lump of solid charge 4, thereby enabling intensive melting of the charge material.

The jet of metal expelled from the stirrer pipe is projected in a fan-like fashion, whereby the pipe is caused to perform a turning motion within a sector, angle $\alpha$ of which is varied to be 1 to 12 times the angle of free flow of the submerged jet of metal, with a definite initial position of the pipe axis being taken as a point of reference.

It is possible to effect the stirring procedure in a manner describe above, i.e. by varying the angle at which the metal is spread in the body of molten metal, from a control board or in accordance with a preset programme by means of a computer through the intermediary of a suitable actuator enabling the turning movement of the stirrer pipe. The stirring procedure according to the invention can be carried out both with or without stepwise alteration of the angle of the stirring zone, this being fully embraced by the attached claims.

The method of invention will be further described by the following illustrative Examples.

EXAMPLE I.

An aluminum alloy was subject to melting under stirring effected by means of a gas pump throughout the melting process in a 30-ton melting furnace. The gas pump was operated at a variable compressed gas pulse frequency of 4 to 20 pulses per minute. The metal was drawn in from upper layers beneath the melt surface, the depth $h_1$ of the stirrer pipe immersion in the melt was 100 mm. The withdrawn metal was then discharged into lower layers of the melt body, the depth $h_1$ of immersion being varied from 300 to 600 with an increase in the level of the melt bath in the process of melting. When the withdrawn metal is expelled into the body of molten metal, the stirrer pipe is caused to turn within a sector, the angle of which is varied from 45 to 120 deg. (from 3 to 8$\alpha$). The stirring operation commenced when the temperature of the melt bath was 660° to 670° C., with the nozzle of the stirrer pipe being immersed in the melt to a depth of 100 mm.

The compressed gas pulse frequency was about 20 pulses per minute in the course of first 10 minutes of the stirring operation, the sector within which the metal jet was discovered constituted about 45 deg (about 3$\alpha$). The molten metal underwent stirring until complete dissolution of solid charge in the melt bath for a period of 20 minutes, the compressed gas pulse frequency being 15 pulses per minute, the metal jet deviating sector constituting about 90 deg. (about 6$\alpha$).

Upon tapping off slag at the melt temperature of 680° to 690° C., alloying components, such as manganese and titanium were incorporated into the melt, and the stirring operation was conducted at the pulse frequency of about 10 pulses per minute, with the metal jet deviating sector being increased to be about 120 C. (about 8$\alpha$). The dissolution of the alloying components was conducted for a period of 30 minutes, the melt temperature was raised and made uniform throughout the body of molten metal to be 730° to 735° C.

Thereafter, the stirring operation was performed with the compressed gas pulse frequency being 4 pulses per minute, the metal jet deviating sector being 120 deg. (about 8$\alpha$).

Such operating mode had been maintained until the moment of pouring the molten metal into a holding furnace. The metal was found free from slag or any other impurities. The change in the mode of stirring was conducted from a control board.

With the stirring procedure of the invention it becomes possible to enhance the effectiveness of stirring and to reduce the time of melting operation by 20 to 25 percent.

As has been mentioned, the stirring procedure, during which the compressed gas pulse frequency is varied stagewise, may be run from a control board or effected in accordance with a preset programme by means of a computer. The stirring operation can be conducted both with or without stepwise alteration in the compressed gas pulse frequency, this being fully embraced by the attached claims.

Example II

An aluminum alloy was subject to melting under stirring effected by means of a gas pump throughout the melting process in a 40-ton melting furnace. The gas pump was operated at a variable compressed gas pulse frequency of 2 to 30 pulses per minute (the gas used was nitrogen). The stirring operation commenced after a bath of molten metal was formed to cover the nozzle of the stirrer pipe, the melt bath temperature being 660° to 670° C. The compressed gas pulse frequency was about 15 pulses per minute in the course of first 10 min. of the stirring operation. Thence, the molten metal underwent stirring for 25 min. until complete dissolution of solid charge, with the compressed gas pulse frrequency being 12 pulses per minute Upon tapping off slag, the melt temperature being 680° to 690° C., alloying components such as manganese and titanium were incorporated into the melt, whereupon the stirring operation continued at the compressed gas pulse frequency of 8 to 9 pulses per minute. The dissolution of the alloying components were on for 30 min., the melt temperature was raised and made uniform throughout the body of molten metal to be 730° to 735° C.

Therefter, uniform temperature of the melt was maintained in the course of stirring operation, the compressed gas pulse frequency being 4 pulses per minute at the moment of pouring molten metal into a holding furnace. The metal was found free from slag or any other impurities.

The method of the invention is superior to the prior-art methods for stirring molten metal in that it ensures stable and uninterrupted stirring operation throughout the melting process, which precludes the freezing of metal in the pipes of gas pumps, as well as their failure;

enhances the effectiveness of stirring process and improves the quality of metal by reason of preventing its contamination with oxides and slag inclusions, which, in turn, permits a gain in yield of the finished metal;

enhances the efficiency of the melting process by 20 to 25 percent.

Figure 4:
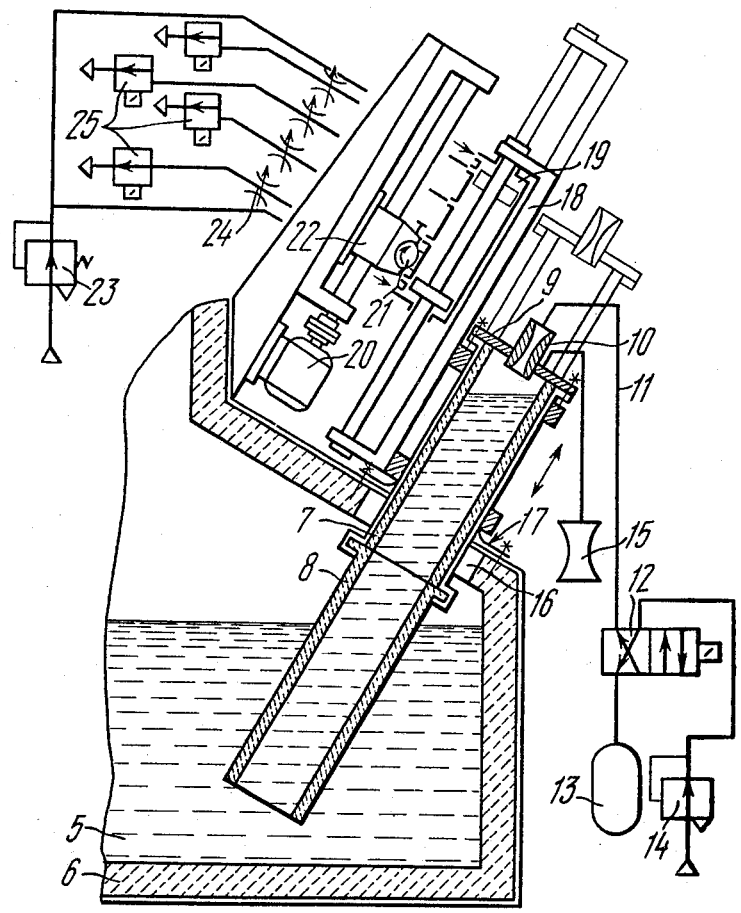
FIG. 4 is a view of an apparatus for stirring molten metal according to the invention.

The apparatus according to the invention for stirring a molten metal 5 (FIG. 4) in a furnace melting chamber 6 comprises a refractory-lined pipe 7 fitted at one end with a detachable nozzle portion 8 which can be positioned at an angle of 0 to 90 deg. to the pipe 7. The nozzle portion 8 is formed of a non-wettable refractory material, the interior passage of said pipe being made of any profile suitable for the purpose. The pipe 7 is provided with a removable cover 9 which carries a nozzle 10 connected by means of a line 11 to a means 12 intended for distributing pulses of compressed gas, such as nitrogen or argon, supplied from a gas vessel 13 of a requisite volume, which depends on the gas pressure maintained by means of a pressure regulator 14. The interior passage of the pipe 7 is brought in communication with a vacuum line 15 at the end face of the nozzle 10.

To withdraw the nozzle portion of the stirrer pipe 7 from the melt 5 and to adjust its vertical position, the stirrer pipe is made movable relative to the furnace refractory-lined melting chamber 6. The stirrer pipe is received in an opening 16 of the furnace melting chamber, and, to prevent the possibility of backfire through the opening 16, there is provided a protective elastic ring 17 formed of a refractory material and secured to the wall of the melting chamber 6. The stirrer pipe 7 is connected with a shifting carrier 18 of an actuator 19 intended to enable stepwise movement of the stirrer pipe 7 in the body of molten metal during each operating cycle. The specific feature of the actuator 19 lies in a variable length of travel of the carrier 18.

In the preferred embodiment of the invention the actuator 19 is formed as a pneumatic positioner, which makes it possible to adjust the travelling length of the stirrer pipe depending upon the depth of the metal bath. It should be pointed that other suitable means, such as adjustable stop, may also be used for regulating the travelling length of the stirrer pipe.

There is provided an actuator 20 intended for initial positioning of the pipe 7 and connecting through a joint member 21 a working member 22 with the main actuator 19, which makes it possible to change the pipe position in two planes.

The working chambers of the pneumatic positioner are in constant communication with a compressed air line through a pressure regulator 23. Exhaust passages of the positioner are in communication with the atmosphere through regulable throttle valves 24 and distributors 25.

Such construction of the actuator 19 enable the stirrer pipe 7 to be moved forward and backward (upward and downward). This feature is especially important in view of the short intervals at which the pump operates.

The pump operates in the following manner.

When the bath of molten metal achieves a permissible level in the furnace melting chamber 6, the pump stirrer pipe 7 is immersed into the metal bath by means of the actuator 20 so that the outlet orifice of the pipe nozzle portion 8 is covered with the metal.

In this position, the vacuum line 15 is brought in communication with the interior of the pipe 7, and the gas holding vessel is communicated with the compressed gas line through the distributor 12 and pressure regulator 14. The molten metal drawn in from the upper layers of the melt bath is raised under the action of vacuum to a desired level in the pump pipe 7.

Thereafter, an electromagnet of the respective distributor is energized to operate the actuator 19 enabling the stirrer pipe 7 to move downward to a desired depth in the melting chamber 6. On energizing the electromagnet of the distributor 12, the gas holding vessel 13 is brought in communiction with the interior of the stirrer pipe 7 through the line 11 and nozzle 10, whereupon compressed gas is rapidly supplied to the interior of the pipe 7 from the vessel 13.

A pulse of gas under pressure applied to the metal in the pipe causes its rapid expulsion into the metal bath in the form of a high velocity jet. The discharged jet of metal is caused to move in the body of molten metal, entraining the adjoining layers thereof and thus stirring the entire volume of the metal bath. The gaseous pressure may also be applied in the process of the pipe downward movement, i.e. during stepwise movement of the stirrer pipe 7, which at times may be very effective especailly when large lumps of charge are melted.

Effective stirring of the entire body of molten metal and more rapid dissolution of alloying additions are made possible through varying both the pipe turning and sloping angles. After a pulse of compressed gas is discharged from the vessel 13, the electromagnet of the distributor 12 is deenergized, as the respective electromagnet of the distributor 25 is concurrently (or at a certain lead) energized. Compressed gas is delivered to the vessel 13 from a gas line, while the stirrer pipe 7 is caused to travel upward for preset length. The speed of travel is adjusted by means of the respective throttle valve 24. Thence, molten metal is again drawn in the pipe 7, mainly from overheated upper layers of the melt bath.

The operating cycle of the pump is resumed in the same order.

In case the depth of the melt bath is varied, another distributor 25 of the actuator 19 is energized, the distributor being on the exhaust line corresponding to the given level of the metal bath. Upon completion of stirring operation, the actuator 20 is operated to move the stirrer pipe 7 upwardly to its upper position, so that the pipe nozzle portion 8 is drawn out of the melt. If required, the apparatus is set in working position by lowering the stirrer pipe 7 by means of the actuator 20 to a present level.

The appatatus of the invention for stirring has been found especially effective for use in melting with a variable level of the melt bath in a furnace.

What is claimed is:

1. A method for stirring molten metal, comprising: alternately withdrawing molten metal upwardly from a body of molten metal in a confined space to a level above the body and expelling the withdrawn metal into the body under a pulse of compressed gas; said molten metal being withdrawn from upper layers of the melt in a metal holding means, disposed immediately beneath the surface of the melt; the withdrawn molten metal being expelled into lower layers of the melt body, adjacent to the bottom of the metal holding means; said alternate metal-withdrawing and metal-expelling steps being effected so that regardless of the level of melt bath, rising in the process of melting, portions of molten metal are invariably withdrawn directly from beneath the surface of the melt body and are discharged into the bottom region of the metal holding means.

2. A method as claimed in claim 1, wherein each portion of metal is expelled into the body of molten metal in a fan-like fashion as a jet of metal projected within the limits of angle $\alpha$ exceeding the angle of a free flow of the submerged metal jet and corresponding to the dimensions of the metal holding means, thereby enabling effective stirring of the melt body throughout the bottom area of the metal holding means.

3. A method as claimed in claim 2, wherein the jet of expelled metal is projected substantially in a fan-like fashion at a progressively increasing, in the process of melting, angle being 1 to 12 times the angle of free flow of metal jet per pulse.

4. A method as claimed in claim 1, wherein the metal-withdrawing and metal-expelling cycles are gradually decreased in number in the course of stirring operation from 30 to 2 cycles per minute.

5. An apparatus for carrying into effect the method of stirring a body of molten metal according to claim 1, comprising a gas pump with a two-ended stirrer pipe having its lower end submerged in the body of molten metal, the other end thereof being fitted with a nozzle metal holding means; said pipe being mounted on guides above said metal holding means for axial reciprocation therealong; an actuator intended to enable stepwise reciprocation of the pipe in the melt body at a regulable speed and length of travel thereof; an actuator intended for initial positioning of the pipe within, and its removal from, the melt.

6. An apparatus as claimed in claim 5, wherein the actuator enabling stepwise reciprocation of the pipe is basiclly a pneumatic positioning device provided with discharge outlets and with regulable throttle valves adapted to communicate the discharge outlets with the atmosphere.

7. An apparatus as claimed in claim 5, wherein a ball-and-socket joint is positioned at the section of the stirrer pipe extending beyond the metal holding means, the pipe angular displacement about the ball-and-socket joint being enabled by a suitable actuator provided for the purpose.

* * * * *